US007938284B2

(12) United States Patent
Goldman et al.

(10) Patent No.: US 7,938,284 B2
(45) Date of Patent: May 10, 2011

(54) BUCKLING CLAMSHELL CONTAINER FOR AUTOMATED ALIQUOT AND DISPERSAL PROCESSES

(75) Inventors: Daniel M. Goldman, Des Moines, IA (US); Michael E. Hartman, Des Moines, IA (US); James L. Hunter, Maxwell, IA (US); David L. Johnson, Johnston, IA (US); Griffiths J. Tucker, Davenport, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 928 days.

(21) Appl. No.: 11/774,256

(22) Filed: Jul. 6, 2007

(65) Prior Publication Data

US 2008/0006627 A1    Jan. 10, 2008

Related U.S. Application Data

(60) Provisional application No. 60/806,660, filed on Jul. 6, 2006.

(51) Int. Cl.
*B65D 51/04* (2006.01)

(52) U.S. Cl. ....... 220/4.22; 220/4.23; 220/281; 220/819

(58) Field of Classification Search .................. 220/281, 220/4.21, 4.22, 4.23, 819, 818, 817, 839, 220/835, 810
See application file for complete search history.

(56) References Cited

U.S. PATENT DOCUMENTS

| 2,729,885 | A | | 1/1956 | Wahl et al. |
| 2,738,912 | A | | 3/1956 | Kieffaber |
| 3,443,720 | A | | 5/1969 | Al-Roy |
| 3,908,824 | A | | 9/1975 | Takahara et al. |
| 4,243,141 | A | * | 1/1981 | Takahashi ..................... 206/380 |
| 4,407,410 | A | * | 10/1983 | Graetz et al. ............. 206/387.13 |
| 4,792,085 | A | | 12/1988 | Waring, III et al. |
| 4,892,220 | A | | 1/1990 | Foos |
| 5,221,040 | A | | 6/1993 | Sorenson |
| 5,332,147 | A | | 7/1994 | Sorenson |

(Continued)

FOREIGN PATENT DOCUMENTS

AT                312 535 B            1/1974

(Continued)

OTHER PUBLICATIONS

International Search Report and favorable Written Opinion for International Appl. No. PCT/US2007/072923, completed Mar. 17, 2008.

(Continued)

*Primary Examiner* — Stephen Castellano
(74) *Attorney, Agent, or Firm* — Alston & Bird LLP (57) ABSTRACT

A package assembly for automated aliquot and/or dispersal processes is provided. Embodiments of the present invention include, but are not limited to: first and second portions which cooperate to contain the aliquot, wherein a pair of flexure channels are defined in opposing sides of at least one of the first or second portions, the flexure channels cooperating to define a flexure axis extending through the pair of flexure channels. Thus, embodiments of the present invention may allow at least one of first and second portions of the package assembly to flex about the flexure axis in response to a force exerted on the package assembly such that the first and second portions separate in response to the force.

18 Claims, 7 Drawing Sheets

U.S. PATENT DOCUMENTS

| | | | |
|---|---|---|---|
| 5,361,562 A | 11/1994 | Nagaoka et al. | |
| 5,388,758 A | 2/1995 | Scovell | |
| 6,349,875 B1 | 2/2002 | Whitnell | |
| 6,474,500 B1 | 11/2002 | Carr et al. | |
| 6,706,989 B2 | 3/2004 | Hunter et al. | |
| 6,832,567 B2 | 12/2004 | Carr et al. | |
| 7,111,567 B2 | 9/2006 | Carr et al. | |
| 7,673,572 B2 | 3/2010 | Deppermann et al. | |
| 7,775,167 B2 | 8/2010 | Stehling et al. | |
| 2006/0124643 A1 | 6/2006 | Markert et al. | |

FOREIGN PATENT DOCUMENTS

| | | |
|---|---|---|
| CH | 393 179 | 10/1965 |
| DE | 33 45 565 A1 | 6/1985 |
| DE | 44 19 475 A1 | 12/1995 |
| FR | 1 074 246 | 10/1954 |
| FR | 2 736 333 A1 | 1/1997 |
| GB | 20118 | 8/1913 |
| GB | 2 367 814 A | 4/2002 |
| WO | WO 93/25444 A1 | 12/1993 |
| WO | WO 2004/048200 A1 | 6/2004 |

OTHER PUBLICATIONS

International Search Report and Written Opinion for International Appl. No. PCT/US2007/072935, completed Oct. 30, 2007, mailed Nov. 12, 2007.

Final Office Action from related U.S. Appl. No. 11/774,205, mailed Nov. 9, 2010.

* cited by examiner

BUCKLING CLAMSHELL CONTAINER FOR AUTOMATED ALIQUOT AND DISPERSAL PROCESSES

CROSS-REFEREN the at least two opposing sides of the container portion. Furthermore, the cover portion may be configured to be capable of flexing outwardly from the container portion about the flexure axis when a force is applied to the at least two opposing sides of the container portion. Thus, the cover portion (and the reinforcing ridge portion extending therefrom) may also disengage from the inner periphery of the opening so that the cover portion disengages from the container portion in response to the force. In some embodiments, the container portion, the cover portion, and the opening defined by the container portion may be constructed and formed to have a substantially rectangular shape.

Some package assembly embodiments of the present invention may further comprise a hinge portion operably engaged between an edge of the cover portion and one of the at least two opposing sides of the container portion such that the cover portion may remain connected to the container portion even as the cover portion is disengaged from closing engagement with the container portion as described above. Furthermore, in some embodiments, the container portion, the cover portion, the reinforcing ridge, and the hinge portion may be substantially integrally formed as a single one-piece assembly. For example, in some embodiments, the container portion, the cover portion, the reinforcing ridge, and the hinge portion may be integrally formed using manufacturing processes that may include, but are not limited to: thermoforming; vacuum forming; blow molding; injection molding; casting; and combinations of such processes.

In some additional package assembly embodiments of the present invention, the package assembly may further comprise a shelf portion including a flange extending substantially perpendicular from an outer periphery of the opening and a wall portion extending substantially perpendicular from the flange such that the reinforcing ridge of the cover portion may engage and rest on the shelf portion in an interference fit so as to selectively close the opening. Other package assembly embodiments may also comprise additional flange portions, including for example, a first flange portion extending substantially perpendicular from at outer periphery of the opening, and a second flange portion extending substantially outward from the reinforcing ridge. Thus, when the cover portion closes the opening defined by the container portion, the first flange portion may be positioned substantially adjacent and parallel to the second flange portion. According to some package assembly embodiments of the present invention comprising the flange portions described generally above, the second flange portion may define a pair of opposing concave portions substantially coaxial with the flexure axis. The pair of opposing concave portions may form a corresponding pair of apertures between the first and second flange portions. Therefore, as the cover portion closes the opening defined by the container portion, the pair of apertures may be adapted to receive an opening tool for encouraging the cover portion to flex outwardly from the container portion about the flexure axis so that the cover portion disengages from the container portion.

In other additional package assembly embodiments of the present invention, the package assembly may further comprise at least one corresponding concave portion defined by the first flange portion and adapted to substantially align with at least one of the pair of concave portions when the cover portion closes. The at least one corresponding concave portion and the at least one opposing concave portion may define a larger aperture between the first and second flange portions. Other package assembly embodiments may further comprise at least one notch portion defined by the first flange portion, the at least one notch portion being adapted to allow a portion of a disengaging tool to pass therethrough for encouraging the cover portion to disengage from the container portion. Other package assembly embodiments may include both a corresponding concave portion defined by the first flange portion and adapted to substantially align with one of the pair of opposing concave portions when the cover portion closes, and at least one notch portion defined by the first flange portion. As a result, disengagement of the cover portion and the container portion may be further facilitated by simultaneously using an opening tool and at least one disengagement device.

Furthermore according to some additional embodiments of the package assembly of the present invention, the flexure channels may define various cross-sectional shapes that may be selected and modified such that at least one of the first or second portions flexes outwardly from the other portion about the flexure axis. For example, the flexure channels may define cross-section shapes that may include, but are not limited to: half circular; rectangular; oval; circular; triangular; and combinations of such cross-sectional shapes. According to various embodiments of the present invention, the components of the package assembly may comprise various materials that may include, but are not limited to: polyethylene terephthalate (PETE); polyvinyl chloride (PVC); polypropylene; polyester; polylactic acid (PLA); high-density polyethylene (HDPE); low-density polyethylene (LDPE); and combinations of such materials.

Thus the various embodiments of the package assembly of the present invention provide many advantages that may include, but are not limited to: providing a closable and easily re-openable container for receiving, containing, and selectively dispensing one or more particulate components (such as an agricultural seed aliquot); providing a container having first and second portions that cooperate to contain the aliquot and that may separate in response to a force applied to the package assembly; providing a container that may be easily nested for storage, manipulated, reliably and positively closed, and re-opened by simple manual and/or automated processes; and providing a closable and re-openable package assembly that is capable of being formed using low-cost manufacturing techniques.

These advantages, and others that will be evident to those skilled in the art, are provided in the package assembly of the present invention.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

While the embodiments of the present invention are described below in the context of an agricultural research environment wherein the package assembly may be used to receive, contain, segregate, and selectively dispense seed aliquots containing seeds of a particular type (such as, for example, seeds corresponding to a selected corn plant hybrid or genetically modified organism (GMO)), it should be understood that the package assembly embodiments of the present invention may also serve as a closable package assembly that is configured to be capable of being opened via a simple application of linear compressive forces. For example, in some embodiments, the package assembly 100 of the present invention may be used to contain components in a "parts kit" in a manufacturing environment such that the components may be closed and contained within package assembly and thereafter be easily removed from the package assembly by simple manual and/or automated steps. In addition, one skilled in the art will appreciate that the package assembly of the present invention may be used for holding and selectively dispensing a variety of particles, components, powders, fluids, foods, and/or other items that may require temporary containment and/or segregation prior to being utilized for a downstream process. Embodiments of the present invention may thus be useful for segregating, containing, and selectively dispensing such items when required. An example of a particulate preparation process is disclosed in U.S. patent application Ser. No. 11/774,230, entitled "System, Method, and Computer Program Product for Automated High-Throughput Seed Sample Aliquot Preparation, Treatment, and Dispersal," which claims priority from U.S. Provisional Application No. 60/806,684, also entitled "System, Method, and Computer Program Product for Automated High-Throughput Seed Sample Aliquot Preparation, Treatment, and Dispersal," both of which are hereby incorporated by reference herein in their entirety. An example of a method of handling a particulate container is disclosed in U.S. patent application Ser. No. 11/774,205, entitled "Method of Handling Clamshell Containers Containing a Particulate Aliquot," which is also hereby incorporated by reference herein in its entirety.

Figure 1:
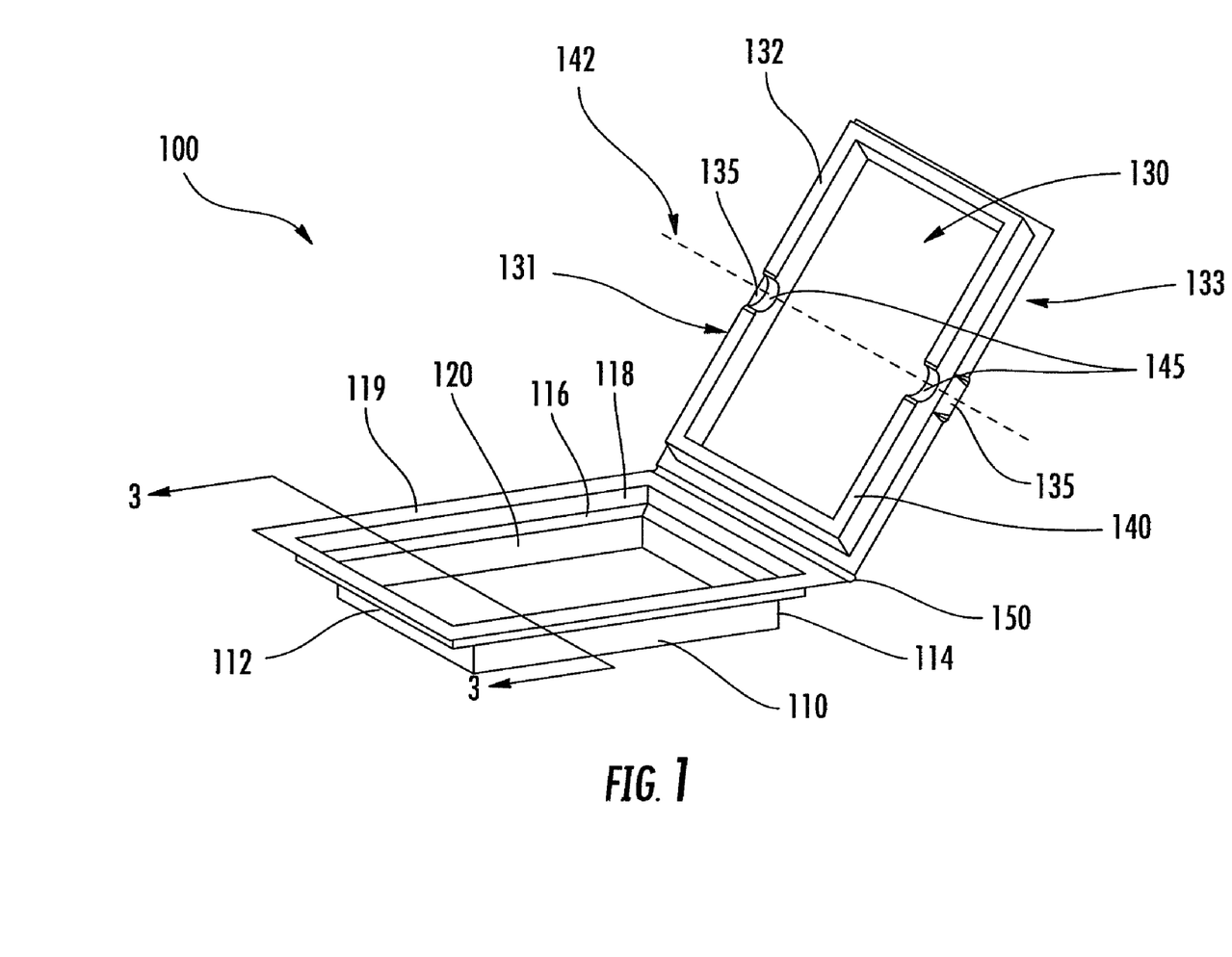
FIG. 1 shows a perspective view of the package assembly according to one embodiment of the present invention.

A package assembly in accordance with the present invention comprises first and second portions that cooperate to contain a particulate aliquot. FIG. 1 shows a perspective view of a package assembly 100 according to one embodiment of the present invention. As shown the package assembly 100 of the depicted embodiment may generally comprise a container portion 110 defining an opening 120 and including at least two opposing sides 112, 114. The package assembly 100 may further comprise a cover portion 130 configured to cooperate with the container portion 110 to selectively close the opening 120 defined by the container portion 110.

Furthermore, in order to effectively close the opening 120 defined by the container portion 110, the cover portion 130 may comprise a reinforcing ridge portion 140 operably engaged about a perimeter of the cover portion 130 and configured to be capable of engaging an inner periphery of the opening 120, in an interference fit, so as to selectively close the opening 120, such that the cover portion 130 is not easily disengaged from the container portion 110 without the application of a compressive force 200, as described herein. Furthermore, the reinforcing ridge portion 140 may also define a pair of flexure channels 145 on opposing sides 131, 133 of the cover portion 130. Furthermore, the flexure channels 145 may cooperate to define a flexure axis 142 extending substantially perpendicularly to the opposing sides 131, 133 of the cover portion 130 defining the flexure channels 145 such that the flexure axis 142 is substantially parallel to the opposing sides 112, 114 of the container portion 110. It should be noted that in various embodiments, only a portion of the cover portion 130 and the container portion 110 may cooperate to hold the portions in a closed position. Moreover, an interference fit need not be required to hold the cover portion 130 in a closed position over the opening 120 of the container portion 110. Package assemblies of various embodiments of the present invention may be configured so that at least one of first or second portions flex outwardly about a flexure access in response to a compressive force. In such a manner, the first and second portions may separate, at least partially, in response to the compressive force, thus releasing at least a portion of a particulate aliquot contained within the package assembly. Thus, for example, package assemblies of other embodiments may comprise independent first and second portions. Additionally, an adhesive or heat sealing material may be used to hold the first and second portions (or a portion of the first and second portions) in a closed position, wherein the adhesive or sealing material is designed to fail when the package assembly is subjected to a compressive force.

According to various embodiments of the present invention, the container portion 110, the cover portion 130, and the opening 120 defined by the container portion may be formed into a variety of different shapes. For example, in some embodiments, as shown generally in FIGS. 1-3, the various components of the package assembly may be formed in a substantially rectangular shape. In other embodiments the various components (such as the container portion 110, cover portion 130, and reinforcing ridge portion 140) may be formed to have a variety of outer shapes, including but not limited to: polygonal shapes (including, but not limited to rectangles, triangles, hexagons); circular; oval; semi-circular; and combinations of such shapes.

Figure 2A:
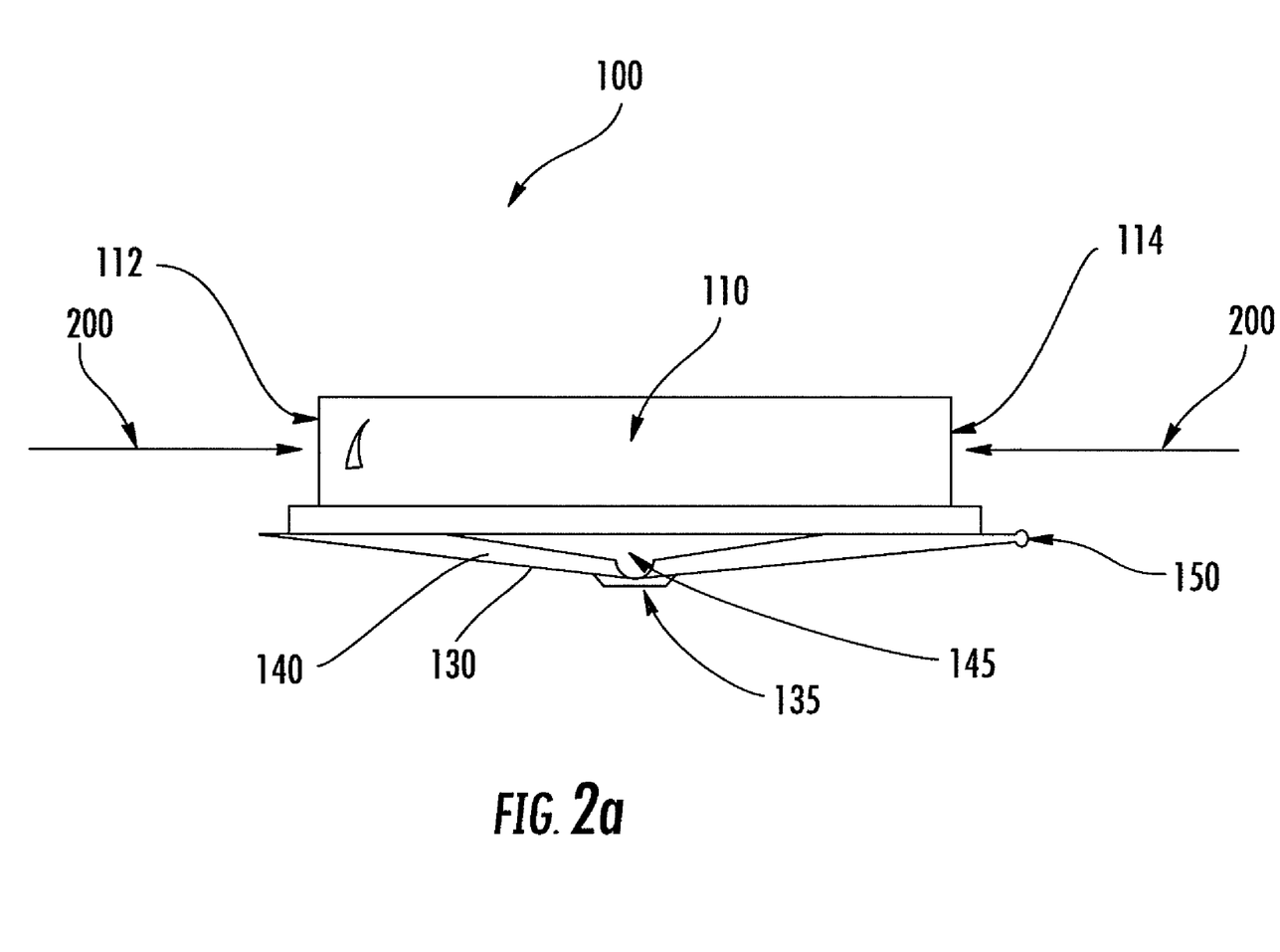
FIG. 2a shows a side view of the package assembly according to one embodiment of the present invention including an exemplary flexing action of the cover portion of the package assembly in response to an applied compressive force.

As shown in FIG. 2a, the flexure channels 145 defined in the reinforcing ridge portion 140 of the cover portion 130 may have a substantially half-circular cross section. According to other embodiments, the flexure channels 145 may also define various other cross-sectional shapes that may be tailored to define a flexure axis 142 (see FIG. 1, for example) extending substantially perpendicularly to the opposing sides 131, 133 of the cover portion 130. For example, the flexure channels 145 may, in some alternative embodiments, define cross-sectional shapes that may include, but are not limited to: rectangular; oval; circular; triangular; and combinations of such cross-sectional shapes. The shape of the cross-section of the flexure channel 145 may thus be tailored to suit the material used to form the cover portion 130 and/or the reinforcing ridge portion 140 so as to define a distinct flexure axis 142 across a width of the cover portion 130 such that the cover portion flexes outwardly from the container portion 110 about the flexure axis 142 defined by the opposing flexure channels 145 (see, for example, FIG. 1 and FIG. 2a (showing the flexing action of the cover portion 130 about the flexure axis 142 in response to a compressive force 200 applied to the container portion 110)).

Thus, as shown generally in FIG. 2a, the cover portion 130 may be configured to flex outwardly from the container portion 110 about the flexure axis 142 (see FIG. 1), when a compressive force 200 is applied to the at least two opposing sides 112, 114 of the container portion 110. The compressive force 200 may thus initiate the disengagement of the reinforcing ridge portion 140 from the inner periphery of the opening 120 so that the cover portion 130 disengages from the container portion 110. As shown generally in FIGS. 2a and 2b, the package assembly 100 of the present invention may, in some exemplary embodiments, be inverted such that the cover portion 130 may drop away from the container portion 110 after the reinforcing ridge portion 140 has been disengaged from the inner periphery of the opening 120 (due, for example, to a compressive force 200 applied to the opposing sides 112, 114 of the container portion 100 as shown generally in FIG. 2a). As shown generally in FIG. 2b, the package assembly 100 may thus be used to disperse a plurality of particles 300 (such as a seed sample aliquot) that have been segregated and contained within the container portion 110 of the package assembly 100 of the present invention. As described generally above, the package assembly 100 embodiments of the present invention may be advantageously opened by the simple application of a compressive force 200 on the opposing sides 112, 114 of the container portion 110 of the package assembly 100 while suspending the package assembly 100 in an inverted position (as shown generally in FIG. 2a). It should be noted that in other embodiments, the application of a compressive force may comprise applying a force to one of opposing sides 112, 114 while the other side is supported, so as to effect a compressive force on the package assembly 100.

According to some other embodiments, the package assembly 100 may be positioned in a substantially upright position (i.e. with the cover portion 130 positioned above the container portion 110) during the application of a compressive force 200 to the opposing sides 112, 114 of the container portion. As described generally above, the cover portion 130 may thus flex outwardly from the container portion 110 about the flexure axis 142 and disengage from the interference fit with an inner periphery of the opening 120 defined in the container portion 110. In such embodiments, a hinge portion 150 (as discussed further below) disposed between the container portion 110 and the cover portion 130 may be biased to expand so as to urge the cover portion 130 away from the container portion 110 once the reinforcing ridge portion 140 of the cover portion 130 has been initially disengaged from the container portion 110 by the application of the compressive force 200.

Figure 2B:
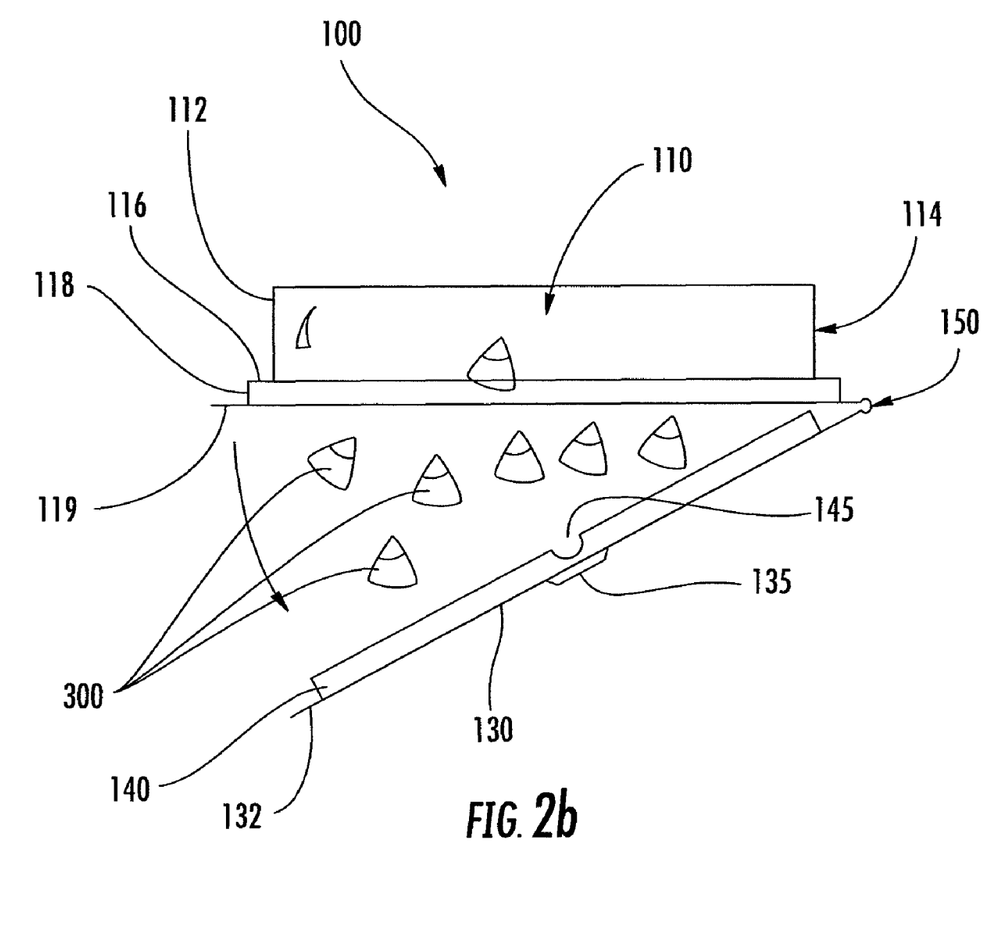
FIG. 2b shows a side view of the package assembly according to one embodiment of the present invention including disengagement of the cover portion from the container portion after the application of a compressive force.

As shown generally in FIGS. 2a and 2b, the package assembly 100 may further comprise a hinge portion 150 operably engaged between an edge of the cover portion 130 and one of the at least two opposing sides 112, 114 of the container portion 110 such that the cover portion 130 and the container portion 110 may form a substantially unitary package assembly 100 even when the cover portion 130 (and the reinforcing ridge portion 140 extending therefrom) is disengaged from the inner periphery of the opening 120 defined in the container portion 110 (as shown generally in FIG. 2b). In some embodiments of the present invention, the hinge portion 150 may be integrally formed with one or both of the container portion 110 and the cover portion 130 to form a unitary package assembly 100. According to some alternative embodiments, the hinge portion 150 may also be operably engaged with one or both of the container portion 110 and the cover portion 130 using an adhesive material in order to form the package assembly 100 (such as that shown, for example, in FIG. 1). As described generally above, the hinge portion 150 may be formed with a bias towards the "open" position (as shown generally in FIG. 2b) such that the hinge portion 150 may urge the cover portion 130 generally away from the container portion 110 once the compressive force 200 has caused the initial disengagement of the reinforcing ridge portion 140 from an inner periphery of the opening 120 defined in the container portion 110.

Figure 3:
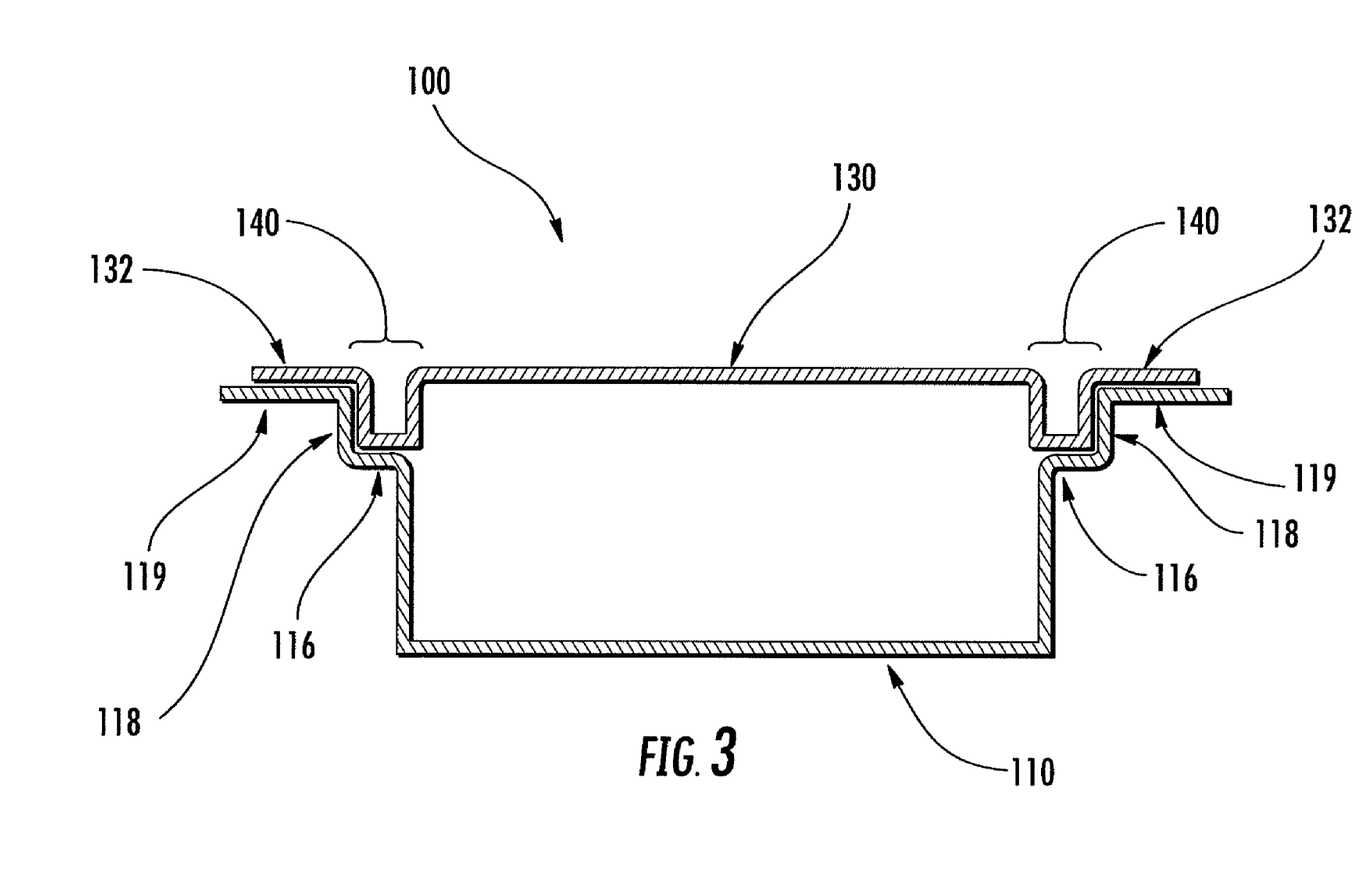
FIG. 3 shows a cross-sectional view of the package assembly according to one embodiment of the present invention showing, for example, the shelf portion, first flange portion, and second flange portion.

In some additional embodiments of the present invention, as shown generally in FIG. 1 and FIG. 3 the package assembly 100 may further comprise a shelf portion including a flange 116 extending substantially perpendicular from an outer periphery of the opening 120 and a wall portion 118 extending substantially perpendicular from the flange 116. The shelf portion defined by the flange 116 and wall portion 118 may thus provide a seating area for the reinforcing ridge portion 140 of the cover portion 130 as the cover portion 130 is engaged with the container portion 110 to close the opening 120 defined therein. For example, as shown in the exemplary cross-sectional view of one embodiment of the package assembly in FIG. 3, the reinforcing ridge 140 may be configured to engage the shelf portion (comprising the flange 116 and wall portion 118, for example) so as to selectively close the opening 120 defined in the container portion. Thus, the shelf portion defined by the flange 116 and wall portion 118 may, in some embodiments, prevent the cover portion 130 from encroaching upon the volume of the container portion 110 and potentially damaging and/or crushing the plurality of particles 300 (such as a seed sample aliquot) contained therein.

Furthermore, as shown generally in FIGS. 1 and 3, the package assembly 100 may also comprise a pair of complementary flange portions 119, 132 extending outward from an outer periphery of the opening 120 and the reinforcing ridge portion 140 of the cover portion 130, respectively. For example, as shown in FIG. 3, the package assembly 100 may further comprise a first flange portion 119 extending substantially perpendicular from at outer periphery of the opening 120 (which may, in some embodiments, be defined by an edge of the wall portion 118 of the shelf portion), and a second flange portion 132 extending substantially outward from the reinforcing ridge 140 such that when the cover portion 130 closes the opening 120 defined by the container portion 110, the first flange portion 119 is substantially adjacent and parallel to the second flange portion 132. Furthermore, as shown generally in FIGS. 1 and 2a, the second flange portion 132 may define a pair of opposing concave portions 135 substantially coaxial with the flexure axis 142. According to such embodiments, the pair of opposing concave portions 135 may form a corresponding pair of apertures between the first and second flange portions 119, 132 when the cover portion 130 closes the opening 120 defined by the container portion 110. For example, in some such embodiments, the pair of apertures defined by the opposing concave portions 135 formed in the second flange portion 132 may be adapted to be capable of receiving an opening tool for encouraging the cover portion 130 to flex outwardly from the container portion 110 about the flexure axis 142 (see generally FIG. 2a) so that the cover portion 130 disengages from the container portion 110. Thus, such opposing concave portions 135 defined by the second flange portion 132 may serve to define a corresponding pair of apertures between the flange portions 119, 132 so that an opening tool (such as, for example, a screwdriver, knife, or other narrow-bladed implement) and/or a fingertip may be inserted into the aperture located at or near the flexure axis 142 so as to urge the cover portion 130 out of its interference fit with the container portion 110. One skilled in the art will also appreciate that the apertures defined by the opposing concave portions 135 defined by the second flange portion 132 may also define a corresponding pair of apertures for receiving an automated tool that may serve to accompany the application of the compressive force 200 (see FIG. 2a, for example) in order to urge the cover portion 130 outwardly from the container portion 110 about the flexure axis 142. The compressive force 200 (coupled with the application of an automated opening tool at the location of the opposing ridges 135) may thus disengage the reinforcing ridge portion 140 from the inner periphery of the opening 120 so that the cover portion 130 disengages from the container portion 110. It should be noted that in other embodiments, one or more concave portions may be located anywhere on the package assembly wherein the concave portion(s) are configured to receive an opening tool for encouraging the first and second portions to separate.

Figure 4:
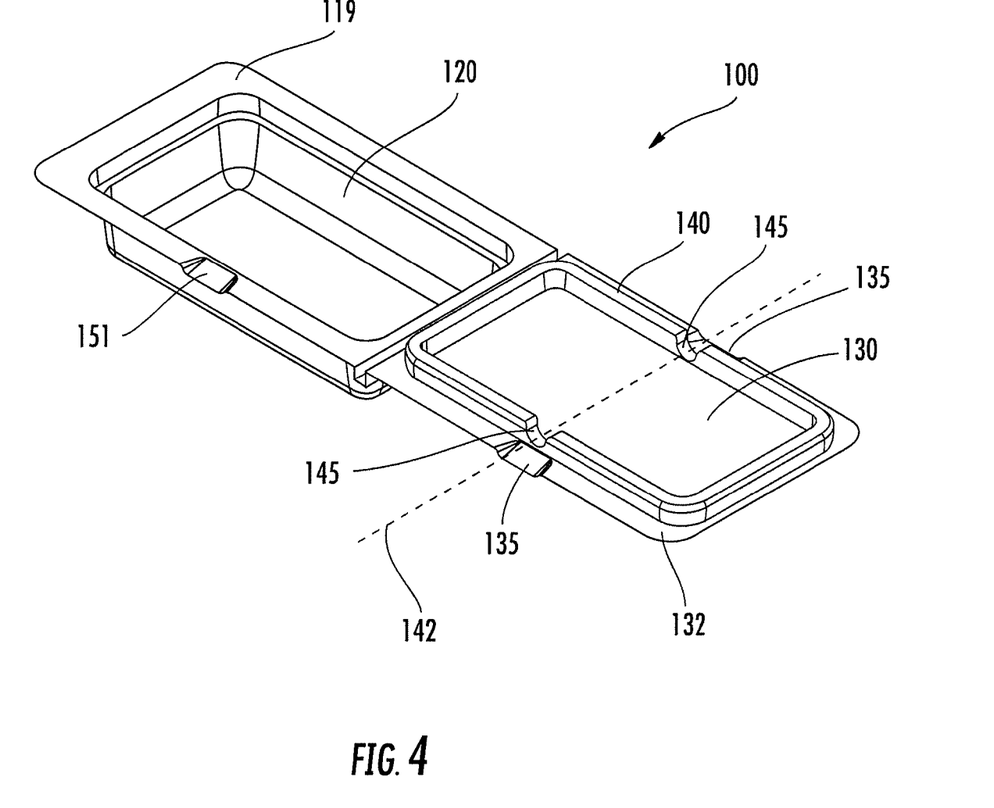
FIG. 4 shows a perspective view of the package assembly according to another embodiment of the present invention that includes a corresponding concave portion defined by the first flange portion.

FIG. 4 shows another exemplary embodiment of a package assembly 100 similar to that shown and described with respect to FIGS. 1-3. As above, the package assembly 100 includes a pair of opposing concave portions 135 defined by the second flange portion 132 of the cover portion 130, however the depicted embodiment also includes at least one corresponding concave portion 151 defined by the first flange portion 119. The corresponding concave portion 151 is configured such that when the cover portion 130 is engaged with the container portion 110, the corresponding concave portion 151 substantially aligns with one of the opposing concave portions 135 defined by the second flange portion 132. In such a manner, the aligned corresponding concave portion 151 and concave portion 135 form a larger aperture between the first and second flange portions 119, 132 when the cover portion 130 closes the opening 120 defined by the container portion 110. As a result, the aperture formed by the corresponding concave portion 151 and the concave portion 135 creates a larger target for receiving an opening tool for encouraging the cover portion 130 to flex outwardly from the container portion 110 about the flexure axis 142 so that the cover portion 130 disengages from the container portion 110. In various embodiments, this may increase opening success for packaging assemblies with dimensional variability. It should be noted that although one corresponding concave portion 151 is shown in the drawing, in other embodiments an opposing concave portion may be included so as to substantially align with the other of the opposing concave portions 135 when the cover portion 130 closes the opening 120 defined by the container portion 110.

Figure 5:
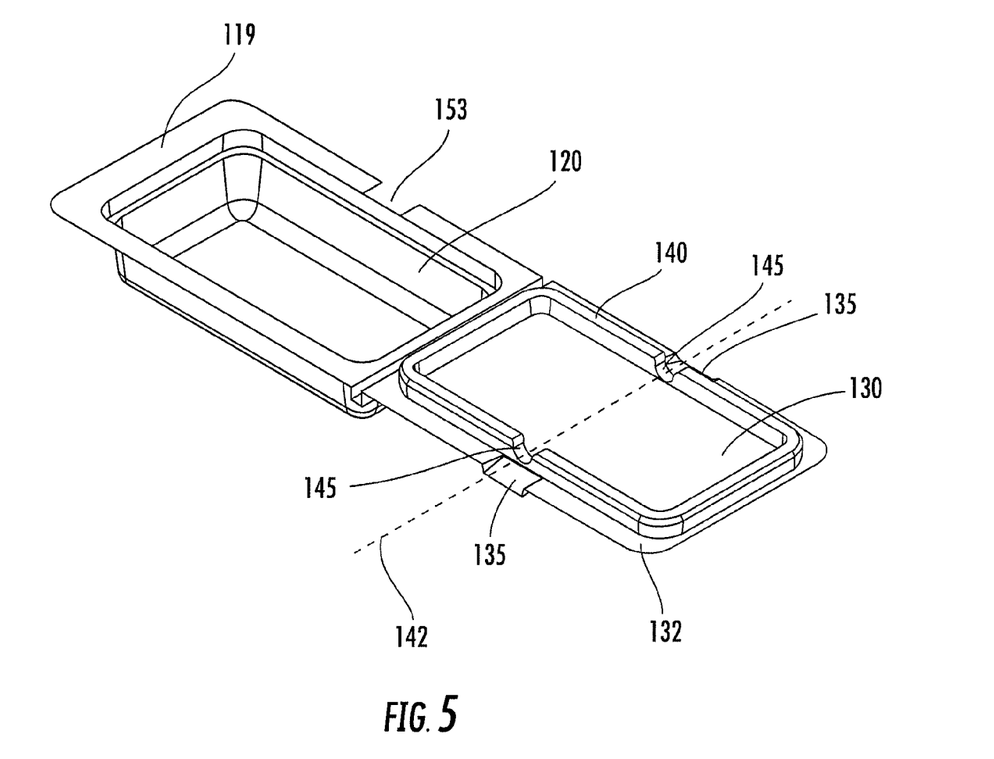
FIG. 5 shows a perspective view of the package assembly according to another embodiment of the present invention that includes a notch portion defined by the first flange portion.

Another exemplary embodiment of the present invention is shown in FIG. 5. This embodiment is similar to that described with respect to FIGS. 1-3, however in this embodiment, at least one notch portion 153 is defined by the first flange portion 119. The notch portion 153 is configured to allow a disengaging device to exert a force against the second flange 132 through the notch portion 153. In such a manner, the disengaging device may further facilitate disengaging the cover portion 130 from the container portion 110. In various embodiments, a disengaging device may be any device, tool, and/or mechanism configured to exert a force through the notch portion 153 against the second flange 132. The disengaging device may comprise, but is not limited to, a pneumatically operated pin. It should be noted that in some embodiments, a disengaging device may be responsible for facilitating disengaging the cover portion 130 from the container portion 110 without the use of an opening device. As such, in various embodiments a disengaging device may be used alone, or in combination with an opening tool received in one or both of the pair of apertures defined by the opposing concave portions 135. As a result, in various embodiments, this may also increase opening success for packaging assemblies with dimensional variability. It should be noted that although the notch portion 153 shown in the depicted embodiment is generally rectangular in shape, one skilled in the art will recognize that a notch portion in accordance with the present invention may take many other shapes, including, but not limited to, a half circular shape, a half oval shape, a triangular shape, a circular shape, an oval shape, and combinations thereof.

Figure 6:
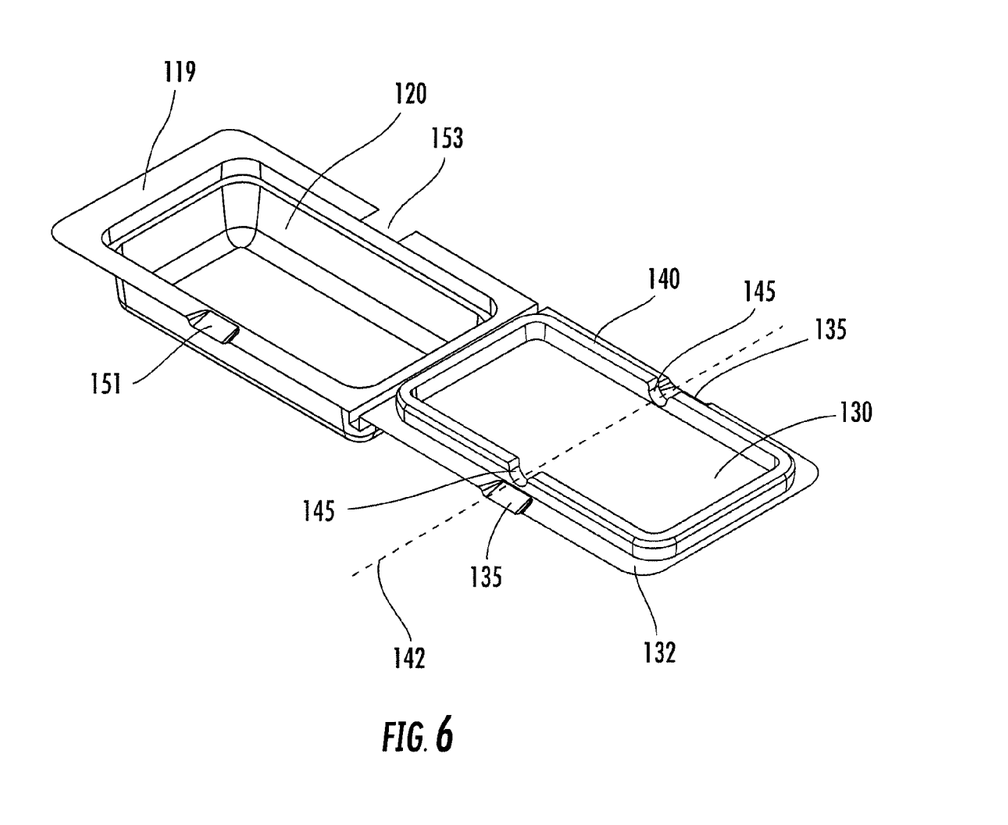
FIG. 6 shows a perspective view of the package assembly according to another embodiment of the present invention that includes both a corresponding concave portion and a notch portion defined by the first flange portion.

FIG. 6 shows still another exemplary embodiment of the present invention. The depicted embodiment includes both a corresponding concave portion 151 and a notch portion 153 defined by the first flange portion 119. As described above, the corresponding concave portion 151 is configured such that when the cover portion 130 is engaged with the container portion 110, the corresponding concave portion 151 substantially aligns with one of the opposing concave portions 135 defined by the second flange portion 132. The notch portion 153 is configured to allow one or more disengaging devices to exert a force against the second flange 132 through the notch portion 153. In such a manner, compressive forces 200 may thus initiate the disengagement of the reinforcing ridge portion 140 from the inner periphery of the opening 120 so that the cover portion 130 disengages from the container portion 110. Additionally, an opening tool may be received by an aperture defined by the concave portion 135 and the corresponding concave portion 151 for encouraging the cover portion 130 to flex outwardly from the container portion 110 about the flexure axis 142 (see generally FIG. 2a). Simultaneously, a disengaging device may exert a force against the second flange 132 through the notch portion 153, to further encourage disengagement of the cover portion 130 from the container portion 110. As a result, in various embodiments, this may further increase opening success for packaging assemblies with dimensional variability.

As described generally above, according to some embodiments of the package assembly 100 of the present invention, the container portion 110, the cover portion 130, the reinforcing ridge 140, and the hinge portion 150 may be substantially integrally formed such that the package assembly may be configured as a substantially one-piece assembly. Various manufacturing processes may be used to generate such single-piece package assembly 100 embodiments. For example, integrally-formed package assemblies 100 may be formed using processes including, but not limited to: thermoforming; vacuum forming; blow molding; injection molding; casting; and combinations of such processes. In addition, and as generally described above, the various container portions 110, cover portions 130, and hinge portions 150 of the package assembly 100 may also, in some embodiments, be molded and/or formed separately and operably engaged in subsequent processes that may include, but are not limited to: joining processes involving the application of a heat source, adhesive application processes, and/or mechanical joining processes (such as, for example stapling).

According to some embodiments of package assembly 100 of the present invention, the various components (including the container portion 110, cover portion 130, reinforcing ridge portion 140, and hinge portion 150, for example) may be composed of one or more different material types. For example, the container portion 110 of the package assembly 100 may be formed of a somewhat flexible, resilient, and/or self-supporting material so as to be capable of responding to a compressive force 200 (exerted, for example, on opposing sides 112, 114 of the container portion 110) and deforming slightly so as to cause the cover portion 130 to flex outwardly about the flexure axis 142 (as shown in an exemplary side view of FIG. 2a). For example, the package assembly 100 may comprise a variety of different polymer compounds that may include, but are not limited to: polyester; polylactic acid (PLA); polypropylene; polyethylene terephthalate (PETE); polyvinyl chloride (PVC); high-density polyethylene (HDPE); low-density polyethylene (LDPE); and combinations of such materials.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A package assembly for selectively containing and releasing a particulate aliquot, the package assembly comprising:
    first and second portions which are configured to cooperate, wherein a pair of flexure channels are defined in opposing sides of the first portion, the flexure channels cooperating to define a flexure axis extending through the pair of flexure channels and substantially perpendicular to the opposing sides, the package assembly being configured such that when a force is applied to at least two opposing sides of the second portion approximately perpendicularly to the flexure axis, the flexure axis moves away from the second portion, the first portion flexes outwardly, and the first portion flexes about the flexure axis so that the first and second portions separate in response to the force.

2. The package assembly according to claim 1, further comprising at least one concave portion located on a flange portion defined by at least one of the first or second portions, the concave portion defining an aperture configured to receive an opening tool for encouraging the first and second portions to separate.

3. The package assembly according to claim 2, further comprising at least one corresponding concave portion located on a second flange portion of the package assembly and adapted to substantially align with the other concave portion to define an aperture configured to receive an opening tool for encouraging the first and second portions to separate.

4. The package assembly according to claim 1, wherein the first and second portions define first and second flange portions and further comprising a notch portion located on one of the first or second flange portions, the notch portion configured to allow a disengaging tool to apply a substantially normal force against the other of the first or second flanges, for encouraging the first and second portions to separate.

5. The package assembly according to claim 1, wherein the first and second portions are held together in a closed position through an interference fit.

6. The package assembly according to claim 1, wherein the flexure channels define a cross-section shape selected from the group consisting of:
    half-circular;
    rectangular;
    oval;
    circular;
    triangular; and
    combinations thereof.

7. The package assembly according to claim 1, wherein the package assembly is formed using a process selected from the group consisting of:
    thermoforming;
    vacuum forming;
    blow molding;
    injection molding;
    casting; and
    combinations thereof.

8. The package assembly according to claim 1, wherein the package assembly comprises materials selected from the group consisting of:
    polyethylene terephthalate;
    polyvinyl chloride;
    polypropylene;
    polyester;
    polylactic acid;
    high-density polyethylene;
    low-density polyethylene; and
    combinations thereof.

9. A package assembly for selectively containing and releasing a particulate aliquot, the package assembly comprising:
    a container portion defining an opening and including at least two opposing sides;
    a cover portion configured to cooperate with the container portion to selectively close the opening defined by the container portion;
    a reinforcing ridge portion operably engaged about a perimeter of the cover portion and configured to be capable of engaging an inner periphery of the opening, in an interference fit therewith, so as to selectively close the opening, the reinforcing ridge portion defining a pair of flexure channels on opposing sides of the cover portion, the flexure channels cooperating to define a flexure axis extending substantially perpendicularly to the opposing sides of the cover portion defining the flexure channels such that the flexure axis is substantially parallel to the at least two opposing sides of the container portion, the cover portion being configured such that when a compressive force is applied to the at least two opposing sides of the container portion, the flexure axis moves away from the container portion, the cover portion flexes outwardly from the container portion, and the cover portion flexes about the flexure axis and thereby disengages the reinforcing ridge portion from the inner periphery of the opening so that the cover portion disengages from the container portion in response to the compressive force.

10. The package assembly according the claim 9 further comprising a hinge portion operably engaged between an edge of the cover portion and one of the at least two opposing sides of the container portion.

11. The package assembly according to claim 9, further comprising a shelf portion including a flange extending substantially perpendicular from an outer periphery of the opening and a wall portion extending substantially perpendicular from the flange and wherein the reinforcing ridge is configured to operably engage the shelf portion so as to selectively close the opening defined by the container portion.

12. The package assembly according to claim 9, further comprising:
   a first flange portion extending substantially perpendicular from an outer periphery of the opening; and
   a second flange portion extending substantially outward from the reinforcing ridge such that when the cover portion closes the opening defined by the container portion, the first flange portion is substantially adjacent and parallel to the second flange portion.

13. The package assembly according to claim 12, wherein the second flange portion defines a pair of opposing concave portions substantially coaxial with the flexure axis, the pair of opposing concave portions forming a corresponding pair of apertures between the first and second flange portions when the cover portion closes the opening defined by the container portion, the pair of apertures adapted to be capable of receiving an opening tool for encouraging the cover portion to flex outwardly from the container portion about the flexure axis so that the cover portion disengages from the container portion.

14. The package assembly according to claim 9, wherein the container portion, the cover portion, the reinforcing ridge portion, and the opening defined by the container portion are substantially rectangular.

15. The package assembly according to claim 10, wherein the container portion, the cover portion, the reinforcing ridge portion, and the hinge portion are integrally formed as a substantially unitary assembly.

16. The package assembly according to claim 13, further comprising at least one corresponding concave portion defined by the first flange portion and adapted to substantially align with at least one of the pair of opposing concave portions when the cover portion closes, the at least one corresponding concave portion and the at least one opposing concave portion defining a larger aperture between the first and second flange portions.

17. The package assembly according to claim 13, further comprising at least one notch portion defined by the first flange portion, the at least one notch portion being adapted to allow a portion of a disengaging tool to pass therethrough for encouraging the cover portion to disengage from the container portion.

18. The package assembly according to claim 13, further comprising:
   a corresponding concave portion defined by the first flange portion and adapted to substantially align with one of the pair of opposing concave portions when the cover portion closes, the corresponding concave portion and the one of the opposing concave portions defining a larger aperture between the first and second flange portions; and
   at least one notch portion defined by the first flange portion, the at least one notch portion being adapted to allow at least a portion of a disengaging device to pass therethrough for encouraging the cover portion to disengage from the container portion.

\* \* \* \* \*